United States Patent [19]

Aleem et al.

[11] Patent Number: 4,609,842
[45] Date of Patent: Sep. 2, 1986

[54] IN-LINE CONSTANT SPEED DRIVE AND GENERATOR

[75] Inventors: Mohd A. Aleem, Roscoe; Wayne A. Flygare; E. William Kruger, both of Rockford, all of Ill.

[73] Assignee: Sundstrand Corporation, Rockford, Ill.

[21] Appl. No.: 674,278

[22] Filed: Nov. 23, 1984

[51] Int. Cl.$^4$ .................. H02K 7/20; H02K 17/44; H02K 19/38; H02K 47/00
[52] U.S. Cl. ........................ 310/112; 310/114; 74/675; 74/686
[58] Field of Search .............. 310/83, 112, 114, 165, 310/152, 156; 74/687, 686, 714, 675, 720; 322/29, 40

[56] References Cited

U.S. PATENT DOCUMENTS

| | | | |
|---|---|---|---|
| 2,449,905 | 9/1948 | Lotts et al. | 74/114 |
| 2,803,112 | 8/1957 | Sadler, Jr. et al. | 60/448 |
| 2,908,189 | 10/1959 | Parker et al. | 74/675 |
| 2,917,948 | 12/1959 | Nussbaumer | 74/687 |
| 2,998,538 | 8/1961 | O'Mahony | 310/85 |
| 3,056,914 | 10/1962 | Potter | 322/40 |
| 3,075,137 | 1/1962 | Bessiere | 322/40 |
| 3,274,855 | 9/1966 | Reynolds et al. | 74/687 |
| 3,365,981 | 1/1968 | Gantzer | 74/687 |
| 3,503,281 | 3/1970 | Gsching et al. | 74/732 |
| 3,576,143 | 4/1971 | Baits | 74/687 |
| 3,786,696 | 1/1974 | Aleem | 74/687 |
| 4,046,029 | 9/1977 | Sugden | 74/687 |
| 4,210,836 | 7/1980 | Kouba | 310/112 |
| 4,252,035 | 2/1981 | Cordner et al. | 74/687 |
| 4,278,928 | 7/1981 | Griffiths et al. | 322/29 |
| 4,305,031 | 12/1981 | Wharton | 322/29 |
| 4,310,768 | 1/1982 | Colley | 290/1 C |
| 4,315,442 | 2/1982 | Cordner | 74/687 |
| 4,481,459 | 11/1984 | Mehl et al. | 322/10 |

Primary Examiner—Patrick R. Salce
Assistant Examiner—Marc S. Hoff
Attorney, Agent, or Firm—Wood, Dalton, Phillips, Mason & Rowe

[57] ABSTRACT

An in-line integrated drive generator including a constant speed drive unit having an input shaft defining an axis, an output including a differential on the axis and a control interconnecting the input shaft and the output to cause the output to rotate at a constant speed independent of the speed of a prime mover connected to the input shaft. A brushless generator assembly having a main field structure and an exciter rotor are disposed on the axis and are connected to the output to be driven thereby. A permanent magnet generator for energizing the exciter includes a permanent magnet assembly rotatable about the axis and contained within the constant speed drive unit. The invention provides an in-line drive generator with minimal frontal area as well as a shortened axial length.

7 Claims, 3 Drawing Figures

IN-LINE CONSTANT SPEED DRIVE AND GENERATOR

FIELD OF THE INVENTION

This invention relates to a generator and constant speed drive for use in, for example, aircraft. More particularly, the invention relates to an axially compact in-line generator and constant speed drive therefor.

BACKGROUND ART

Over the years, a number of proposals for generators with constant speed drives have evolved. In general, the proposals have been for use in aircraft but those skilled in the art will readily recognize that the same may have applicability in any instance where a prime mover, whose speed is varied from time to time in the course of its operation, is coupled to the generator which in turn is intended to provide a constant frequency output.

Generally speaking, there are two general categories of generator and constant speed drive constructions. One category is exemplified, for example, in U.S. Pat. No. 4,315,442 issued Feb. 16, 1982 to Cordner. In this category, the generator and the constant speed drive are placed side by side, that is, their respective rotational axes are non-coaxial and generally parallel. Such a construction provides a unit of short axial length which in turn is an advantage where the unit is mounted on only one of its ends and hangs from the mounting in a cantilevered fashion. Specifically, the relatively short axial length minimizes the bending moment placed on the mounting by the weight of the unit.

However, this type of unit necessarily has a large frontal area, that is, the area of a cross section of the unit projected on a plane extending transversely to the rotational axes of the components. As a consequence, some difficulty may be present when it is attempted to place the unit in an engine compartment in an aircraft where the frontal areas of cowlings and the like are generally kept to a minimum for aerodynamic purposes.

To solve this difficulty, the art has evolved the second general category of constant speed drive and generator units. It is the so-called in-line unit and is exemplified, for example, by U.S. Pat. No. 3,576,143 issued Apr. 27, 1971 to Baits. In an in-line unit, the rotational axes of the input to the constant speed drive and the generator are coaxial. This arrangement minimizes frontal area thus lending itself to utilization in aircraft engine compartments where small frontal area is required. At the same time, however, this arrangement increases the axial length of the unit so that, when cantilever mounted, there is an increase in the bending moment placed on the mounting. This in turn may require the use of a stronger mounting which, in the case of aircraft, will usually result in an undesirable increase in weight.

Thus, there exists a need for an in-line constant speed and generator unit to satisfy the needs of applications requiring minimal frontal area and which has a minimal axial length to minimize the bending moment produced on mountings to thereby avoid the creation of a weight penalty.

SUMMARY OF THE INVENTION

It is the principal object of the invention to provide a new and improved in-line constant speed drive and generator assembly. More specifically, it is an object of the invention to provide such an assembly with a minimum axial length.

An exemplary embodiment of the invention achieves the foregoing objects in a construction including a constant speed drive unit having an input shaft adapted to be connected to a prime mover, an output including a differential defining an axis and means interconnecting the input shaft and the output to cause the output to rotate at a constant speed independent of the speed of the prime mover within its rated speed levels. A brushless generator including a rotatable main field structure and an exciter rotor therefor are both rotatable about the axis and are connected to the output to be driven thereby. A permanent magnet generator for energizing the exciter is provided and includes a permanent magnet assembly rotatable about the axis and contained within the constant speed drive unit and is mounted on the output. As a consequence, an in-line drive generator with minimal frontal area and axial length is provided by incorporating the permanent magnet generator within the constant speed drive.

In a preferred embodiment, the output is defined by a ring gear in the differential and the permanent magnet assembly is carried by the ring gear.

The invention contemplates that there be first and second axially aligned and interconnected housings, one containing the brushless generator and the other containing the constant speed drive unit and the permanent magnet generator.

By another definition, the invention achieves the foregoing objects in a construction including a coaxial, rotatable exciter rotor and main field rotor assembly which are rotatable about an axis. An input shaft adapted to be connected to a prime mover is located on the axis and is in spaced relation to the rotor assembly. A differential is interposed between the shaft and the assembly and has a rotary output element on the axis which is drivingly connected to the rotor assembly. The differential further includes a first input element connected to the input shaft and a second input element axially adjacent to the first input element and spaced from the output element. A permanent magnet generator including a permanent magnet rotor assembly is mounted on and driven by the output element and coaxial fixed and variable displacement hydraulic units are provided in spaced relation to the axis. Means including telescoping shafts with one shaft thereof extending through one of the hydraulic units connect one of the units to the input shaft and the other of the units to the second input element.

Other objects and advantages will become apparent from the following specification taken in connection with the accompanying drawings.

DESCRIPTION OF THE PREFERRED EMBODIMENT

Figure 1:
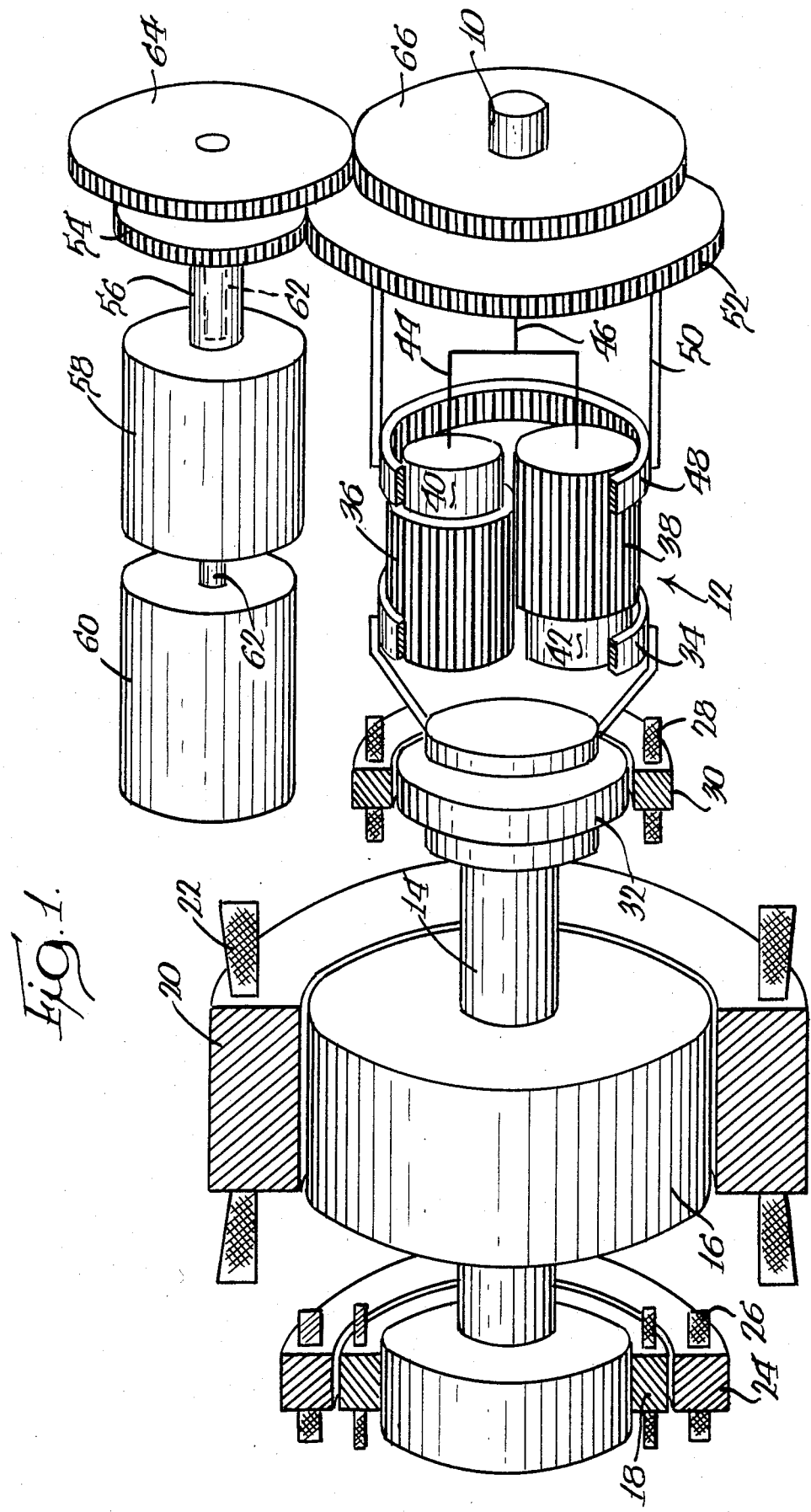
FIG. 1 is a somewhat schematic, perspective view of an in-line constant speed drive and generator unit made according to the invention.

An exemplary embodiment of a constant speed drive and generator unit made according to the invention embodies the major components of prior art units, whether of the side by side category or of the in-line category. Thus, the generator is typically a brushless generator and as such includes a main stator in which the power at the desired frequency is generated. A main field rotor induces current in the main stator and in turn is energized by rectified current induced in the rotor of an exciter. The field of the exciter is generated by current produced in a permanent magnet generator. The permanent magnet generator includes a rotatable permanent magnet assembly which rotates relative to a stator and induces current in windings associated with such stator which is in turn employed to energize the exciter field.

The three generator components just identified are driven by the output of a differential forming part of the constant speed drive. The differential receives two inputs, one a variable speed input from the prime mover with which the unit is to be associated, and the other a control input which varies dependent upon prime mover speed. Typically, the control input is a modification of the prime mover input, the modification being achieved by inputting the prime mover speed to a hydraulic unit and outputting the hydraulic unit speed to the control input of the differential. The hydraulic unit is typically composed of a fixed displacement unit and a variable displacement unit.

With the foregoing in mind, the invention will be described with reference to the drawings.

As seen therein, there is provided an input shaft 10 which is adapted to be connected to a variable speed prime mover. The input shaft 10 may be coaxial with a differential, generally designated 12, which in turn is coaxial with a shaft 14 which mounts the main field rotor 16 of the generator as well as the exciter rotor 18 and suitable rectifying means (not shown) for converting the alternating current induced in the exciter rotor 18 to direct current to energize the main field rotor 16.

The main field rotor 16 is surrounded by a main stator 20 having windings 22 in which alternating current at a desired, constant frequency, in one or more phases, is generated.

The exciter rotor 18 is likewise surrounded by a stator 24 having windings 26. The passage of current through the windings 26 creates a magnetic field in the stator 24 to induce the aforementioned current in the exciter rotor 18.

Energization current for the windings 26 is taken from windings 28 associated with a stator 30 surrounding a permanent magnet assembly 32 mounted on the output of the differential 12 as will be seen. The elements 28, 30 and 32 define a permanent magnet generator as mentioned previously. It will be appreciated that the components as described define an in-line constant speed drive and generator unit to provide minimal frontal area.

The differential 12 includes an output ring gear 34 on which the permanent magnet assembly 32 is mounted so as to be carried thereby rotatably in unison with rotation of the output ring gear 34.

The differential 12 also includes two meshed gears 36 and 38 which are meshed at their center portions and have respective reliefs 40 and 42 adjacent their right and lefthand ends, respectively, as viewed in FIG. 1. Consequently, it will be appreciated that the gear 36 is meshed with the output ring 34 while the gear 38 is not by reason of its relief 42 being aligned with the output ring gear 34.

The meshed gears 36 and 38 are journalled on a carrier shown schematically at 44 in FIG. 1 and connected by a shaft 46 on the axis of the input shaft 10 to the input shaft 10. This connection serves as a first input to the differential 12.

A second input to the differential 12 is provided by an input ring gear 48 which is closely axially adjacent to the first input defined by the carrier 44 and axially spaced from the output ring gear 34. The ring gear 48 is meshed with the gear 38 but not with the gear 36 by reason of its overlying the relief 40 in the latter.

The input ring gear 48 receives a controlled input to assure that the output ring gear 34 is driven at constant speed to rotate the rotatable generator components at a constant speed. This is accomplished by means of a coupling 50 extending to a gear 52 journalled on the axis of rotation defined by the shaft 10. The gear 52 is meshed with a gear 54 carried by the output shaft 56 of a fixed displacement hydraulic unit 58 of the type illustrated in the previously identified U.S. patents. The fixed displacement unit 58, when acting as a hydraulic motor, receives hydraulic fluid from a variable displacement hydraulic unit 60 which is coaxial with the unit 58. The variable displacement unit 60 is also configured as illustrated in the previously identified U.S. patents. A shaft 62 drives the variable displacement unit 60 and extends through the fixed displacement unit 58 in telescoping relation with the shaft 56 to be fixed to a gear 64 which is in turn meshed with a gear 66 carried by the input shaft 10. By this construction, it will be observed that the connection extending to the units 58 and 60 from the input shaft 10 and to the differential 12 is essentially planar, that is, in a radial plane transverse to the shaft 10 to thereby provide substantial axial compactness. It will also be appreciated from FIG. 1 that the rotational axes for the shafts 56 and 62 is parallel to the rotational axis of the shaft 10, the differential 12, and the various generator components; and that the combined axial length of the permanent magnet generator components 28, 30 and 32, the differential 12, and the connecting gears 52 and 66 is substantially equal to or less than the combined axial length of the hydraulic units 58 and 60 and the gears 54 and 64. Thus, by locating the permanent magnet assembly 32 on the output, that is, on the ring gear 34, the permanent magnet generator may be disposed within the constant speed drive portion of the unit rather than in the generator portion of the unit to reduce the axial length of the overall assembly.

Additional ones of the units 58 and 60 can be employed as required at other locations angularly spaced from the units 58 and 60 shown, if desired.

Figure 2A:
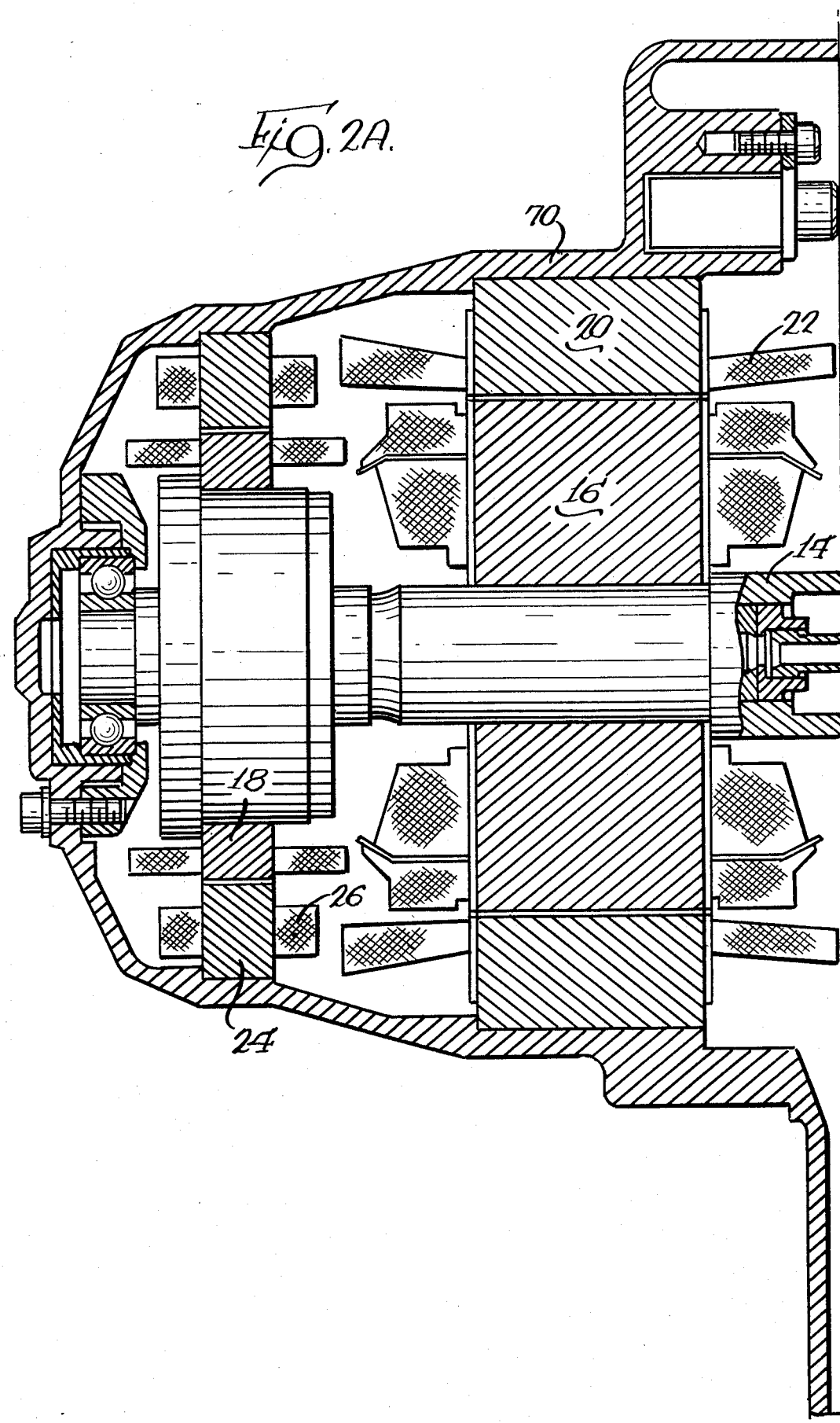
FIG. 2 is composed of FIGS. 2a and 2b, the latter to be placed to the right of the former and is a sectional view of one embodiment of the invention.
Figure 2B:
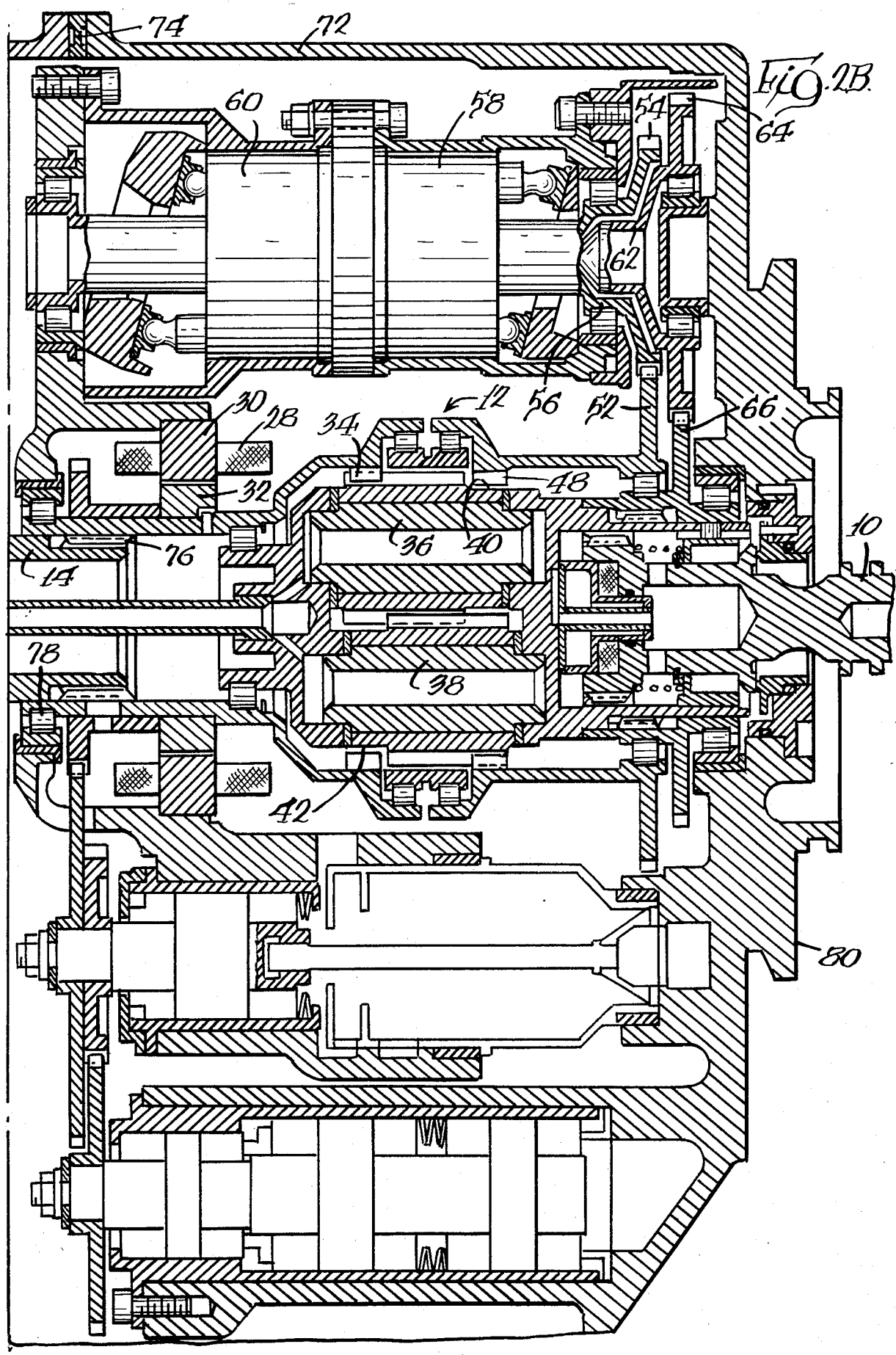

FIGS. 2a and 2b illustrate in refined mechanical drawing form, the constant speed drive and generator unit shown schematically in FIG. 1. Like reference numerals have been given corresponding components. Also illustrated are typical first and second housings 70 and 72 which are axially aligned and interface at 74. The housing 70 contains the brushless generator components including the main field rotor 16 and the main stator 20 and associated winding 22 along with the exciter rotor 18, exciter stator 24 and the winding 26 associated therewith. Conversely, the housing 72 contains the constant speed drive components and the components forming the permanent magnet generator including the rotatable magnet assembly 32, the permanent magnet generator stator 30 and the winding 28 associated therewith.

FIGS. 2a and 2b also show various bearings required to support the rotatable parts as well as, in the lower part of the housing 72, numerous components customarily provided in constant speed drives which are well known to those skilled in the art and whose description is not of particular relevance to the present invention.

For assembly purposes, as seen in FIG. 2b, the shaft 14 is connected to the ring gear 34 by means of splines 76 formed on the righthand end of the shaft 14. Specifically, the shaft 14 has radially outwardly extending splines telescopingly received in a hollow end of the ring gears 34 having radially inwardly directed splines.

Journalling for the righthand end of the shaft 14 is achieved by the provision of bearings 78 which journal the lefthand end of the ring gear 34 in which the righthand end of the shaft 14 is snugly received.

In one embodiment of the invention, there is achieved an overall reduction in the axial length of the constant speed drive and generator system of two inches over prior art constructions and in the case of a generator rated at 30/40 kilowatts, the overall length of the unit will be about 14 inches. This 15% reduction in length commensurately decreases the bending moment applied to a mounting (not shown) which customarily receives the unit at a face 80 on the housing 72 since the center of gravity of the unit is shifted in the direction of the face 80 in relation to a comparable unit having a greater axial length.

Furthermore, the reduction in length provides a reduction in weight of the unit itself since smaller housings can be employed and there is a reduction in the axial length of a number of components which of course reduces their weight. For a similarly rated generator, it has been found that a 12 pound weight reduction over a conventional unit weighting 72 pounds is obtainable. This amounts to a 17% weight reduction.

The resulting unit is of sufficiently light weight as to permit the use of a mounting flange integral with the basic housing and formed of the same material, typically magnesium. Thus, a separate flange, formed of a stronger material can be avoided which further decreases unit length and weight. The lighter weight also enables the use of a smaller diameter mounting pad and ultimately, the use of a smaller and lighter gear box, providing potential for even greater weight savings.

Furthermore, the axial length reduction provides a substantial increase in the stiffness of the generator rotor. This in turn considerably increases the critical rotational speed of the rotor, or, in the alternative, allows the use of lesser material to effect further weight reduction.

Over a period of use typically encountered in aircraft installations, the weight reduction achieved by the invention will provide a substantial fuel saving as well as increase the useful load carrying capability of the aircraft.

We claim:
1. An in-line integrated drive generator comprising:
a constant speed drive unit including an input shaft and adapted to be connected to a prime mover, an output including a differential on an axis and means interconnecting said input shaft and said output to cause said output to rotate at a constant speed independent of the speed of a prime mover;
a brushless generator including a main field structure and an exciter rotor therefor both rotatable about said axis and connected to said output to be driven thereby;
a permanent magnet generator for energizing an exciter and including a permanent magnet assembly rotatable about said axis and contained within said constant speed drive unit and mounted on said output;
and first and second axially aligned and interconnected housings, one containing said brushless generator and the other containing said constant speed drive unit and said permanent magnet generator;
whereby an in-line generator with minimal frontal area and axial length is provided.

2. The in-line integrated drive generator of claim 1 wherein said output is defined by a ring gear in said differential and said permanent magnet assembly is carried by said ring gear.

3. An in-line integrated drive generator comprising:
a coaxial, rotatable exciter rotor and main field rotor assembly rotatable about an axis;
an input shaft adapted to be connected to a prime mover and located in spaced relation to said assembly;
a differential interposed between said shaft and said assembly and having a rotary output element on or near said axis and drivingly connected to said assembly, a first input element connected to said shaft and a second input element axially adjacent said first input element and axially spaced from said output element;
a permanent magnet generator including a permanent magnet rotor assembly mounted on and driven by said output element;
coaxial fixed and variable displacement hydraulic units spaced from said axis;
means including telescoping shafts with one shaft thereof extending through one of said units, connecting one of said units to said input shaft and the other of said units to said second input element;

and a pair of interconnected housings, one containing said assembly and the other contrining said differential and said permanent magnet generator.

4. The in-line integrated drive generator of claim 3 wherein said one shaft extends through said fixed displacement unit to drive said variable displacement unit and is connected to said input shaft and another of said telescoping shafts houses said one shaft and drivingly interconnects said fixed displacement and said second input element.

5. The in-line integrated drive generator of claim 4 wherein said output element and said second input element comprise ring gears and said differential further includes at least two meshing gears, one gear further meshing with one ring gear and the other gear further meshing with the other ring gear; and said first input element comprises a carrier journalling said meshing gears.

6. The in-line integrated drive generator of claim 3 wherein said telescoping shafts are parallel to said axis and the combined axial length of said units and said connecting means is approximately equal to the combined axial length of said connecting means, said differential and said permanent magnet generator.

7. The in-line integrated drive generator of claim 4 wherein said connecting means comprise sets of meshed gears, one set for each of said telescoping shafts, said sets being closely axially adjacent to each other and non-axially spaced from said input shaft.

* * * * *